(12) United States Patent
Dlugosz et al.

(10) Patent No.: US 10,902,640 B2
(45) Date of Patent: Jan. 26, 2021

(54) METHOD FOR IDENTIFICATION OF CHARACTERISTIC POINTS OF A CALIBRATION PATTERN WITHIN A SET OF CANDIDATE POINTS DERIVED FROM AN IMAGE OF THE CALIBRATION PATTERN

(71) Applicant: Aptiv Technologies Limited, St. Michael (BB)

(72) Inventors: Rafal Dlugosz, Poznan (PL); Waldemar Dworakowski, Cracow (PL); Krzysztof Gongolewski, Cracow (PL)

(73) Assignee: Aptiv Technologies Limited, St. Michael (BB)

( * ) Notice: Subject to any disclaimer, the term of this patent is extended or adjusted under 35 U.S.C. 154(b) by 80 days.

(21) Appl. No.: 16/266,268

(22) Filed: Feb. 4, 2019

(65) Prior Publication Data
US 2019/0266752 A1  Aug. 29, 2019

(30) Foreign Application Priority Data
Feb. 28, 2018  (EP) .................................... 18159315

(51) Int. Cl.
| | |
|---|---|
| *G06T 7/80* | (2017.01) |
| *G06T 7/73* | (2017.01) |
| *G06K 9/32* | (2006.01) |
| *G06K 9/62* | (2006.01) |

(52) U.S. Cl.
CPC .............. *G06T 7/80* (2017.01); *G06K 9/3233* (2013.01); *G06K 9/6211* (2013.01); *G06T 7/74* (2017.01); *G06T 2207/30208* (2013.01); *G06T 2207/30252* (2013.01)

(58) Field of Classification Search
CPC .... G06T 7/33; G06T 7/34; G06T 7/73; G06T 7/74; G06T 7/80; G06T 2207/30208; G06K 9/3216; G06K 2009/3225; G06K 9/3233; G06K 9/4604; G06K 9/4609; G06K 9/6206; G06K 9/6211
See application file for complete search history.

(56) References Cited

U.S. PATENT DOCUMENTS

| | | | | |
|---|---|---|---|---|
| 5,982,912 | A * | 11/1999 | Fukui et al. ........ | G06K 9/00221 382/115 |
| 6,292,171 | B1 | 9/2001 | Fu et al. ........................ | 345/156 |
| 6,915,072 | B2 | 7/2005 | Takahashi et al. ............ | 396/296 |
| 8,295,588 | B2 | 10/2012 | Fujieda et al. ................ | 382/154 |
| 9,319,667 | B2 | 4/2016 | Lin et al. .............. | H04N 17/002 |
| 9,441,958 | B2 | 9/2016 | Hara ................... | G01B 11/2504 |
| 9,739,603 | B2 | 8/2017 | Hara ................... | G01L 11/2504 |
| 10,218,961 | B2 | 2/2019 | Kishiwada et al. . | H04N 13/246 |
| 10,776,953 | B2 | 9/2020 | Dworakowski et al. ................... | G06T 7/80 |
| 2002/0044676 | A1 | 4/2002 | Wei et al. ...................... | 382/132 |
| 2004/0225472 | A1 | 11/2004 | Kraft ............................ | 702/150 |
| 2006/0215031 | A1 | 9/2006 | Krahnstoever et al. ...... | 348/187 |
| 2006/0288325 | A1 | 12/2006 | Miyamoto et al. ............ | 716/19 |
| 2007/0047940 | A1 | 3/2007 | Matsumoto et al. ......... | 396/106 |
| 2008/0080744 | A1 | 4/2008 | Tanaka ......................... | 382/118 |
| 2008/0095445 | A1 | 4/2008 | Brandt ......................... | 382/203 |
| 2008/0170228 | A1 | 7/2008 | Jiang ............................ | 356/416 |
| 2009/0231374 | A1 | 9/2009 | Van De Wynckel et al. ............... 347/12 |
| 2009/0299684 | A1 | 12/2009 | Imanishi et al. .............. | 702/150 |
| 2010/0134634 | A1 | 6/2010 | Witt ............................. | 348/181 |
| 2010/0217416 | A1 | 8/2010 | Murabata ....................... | 700/98 |
| 2010/0232681 | A1 | 9/2010 | Fujieda et al. ................ | 382/154 |
| 2010/0295948 | A1 | 11/2010 | Xie et al. ..................... | 348/175 |
| 2010/0315601 | A1 | 12/2010 | Furui ............................. | 353/70 |
| 2011/0069284 | A1 | 3/2011 | Furui ............................. | 353/70 |
| 2011/0234759 | A1 | 9/2011 | Yamaya et al. ................ | 348/46 |
| 2011/0300939 | A1 | 12/2011 | Mao et al. .................... | 463/36 |

(Continued)

FOREIGN PATENT DOCUMENTS

| | | |
|---|---|---|
| CN | 103035005 A | 4/2013 |
| EP | 3125196 A1 | 2/2017 |

(Continued)

OTHER PUBLICATIONS

"Extended European Search Report", EP Application No. 15196969.8, dated May 9, 2016, 5 pages.
"Final Office Action", U.S. Appl. No. 15/779,904, dated Apr. 14, 2020, 10 pages.
"International Preliminary Report on Patentability", Application No. PCT/EP2016/078006, dated Jun. 14, 2018, 7 pages.

(Continued)

*Primary Examiner* — Andrew W Johns
(74) *Attorney, Agent, or Firm* — Colby Nipper PLLC (57) ABSTRACT

This document describes an improved method for identifying of characteristic points of a calibration pattern within a set of candidate points in an image of the calibration pattern. The method includes scaling a template arrangement of template points that corresponds to the calibration pattern to an initial size. The method uses the scaled template arrangement to determine potential characteristic points. The method then determines whether the potential characteristic points meet a termination criterion. If the termination criterion is not met, the scaling of the template arrangement is modified and the previous step and this step are repeated. If the termination criterion is met, the potential characteristic points are identified as the characteristic points. In this way, the described method provides a robust means to automatically identify the characteristic points in the image of the calibration pattern without having to determine the distance between a camera and the calibration pattern.

20 Claims, 3 Drawing Sheets

(56) References Cited

U.S. PATENT DOCUMENTS

| | | | |
|---|---|---|---|
| 2011/0321084 A1* | 12/2011 | Takahashi et al. | ................ H04N 5/23293 725/32 |
| 2012/0033087 A1 | 2/2012 | Takeda et al. | 348/187 |
| 2012/0230600 A1 | 9/2012 | Tsai et al. | 382/260 |
| 2012/0233841 A1 | 9/2012 | Stein | 29/428 |
| 2012/0327220 A1 | 12/2012 | Ma | 348/135 |
| 2013/0051664 A1 | 2/2013 | Fujita et al. | 382/165 |
| 2013/0216153 A1 | 8/2013 | Hsu | G06T 5/002 |
| 2014/0043473 A1 | 2/2014 | Gupta et al. | H04N 17/00 |
| 2014/0293299 A1 | 10/2014 | Ozawa | H04N 1/56 |
| 2015/0049193 A1 | 2/2015 | Gupta et al. | B60R 11/04 |
| 2015/0078675 A1 | 3/2015 | Tian et al. | G06T 5/002 |
| 2015/0245020 A1 | 8/2015 | Meier et al. | H04N 17/002 |
| 2015/0287215 A1 | 10/2015 | Ohba et al. | |
| 2016/0180176 A1 | 6/2016 | Yamamoto | G06K 9/00791 |
| 2017/0177973 A1* | 6/2017 | Hu | G06T 7/13 |
| 2017/0316557 A1 | 11/2017 | Inoue | G06T 7/001 |
| 2018/0080787 A1 | 3/2018 | Laine et al. | G01C 21/3602 |
| 2018/0122099 A1 | 5/2018 | Lee | G06T 7/80 |
| 2018/0170540 A1 | 6/2018 | Claybrough | B64C 39/024 |
| 2018/0197276 A1 | 7/2018 | Kim et al. | G06T 5/001 |
| 2018/0322656 A1 | 11/2018 | Dworakowski et al. | G06T 7/80 |
| 2018/0357509 A1* | 12/2018 | Dlugosz et al. | G06K 9/3233 |
| 2018/0357791 A1 | 12/2018 | Dworakowski et al. | G06T 7/80 |
| 2019/0266753 A1 | 8/2019 | Dworakowski et al. | G06T 7/80 |

FOREIGN PATENT DOCUMENTS

| | | |
|---|---|---|
| EP | 3 173 979 A1 | 5/2017 |
| EP | 3179462 A1 | 6/2017 |

OTHER PUBLICATIONS

"International Search Report and Written Opinion", Application No. PCT/EP2016/078006, dated Jan. 3, 2017, 8 pages.

"Non-Final Office Action", U.S. Appl. No. 15/779,904, dated Oct. 25, 2019, 6 pages.

"Notice of Allowance", U.S. Appl. No. 15/779,904, dated Jul. 15, 2020, 8 Pages.

"Advisory Action", U.S. Appl. No. 15/779,895, dated Apr. 17, 2020, 2 pages.

"Final Office Action", U.S. Appl. No. 15/779,880, dated Mar. 23, 2020, 10 pages.

"Final Office Action", U.S. Appl. No. 15/779,895, dated Dec. 12, 2019, 17 pages.

"Non-Final Office Action", U.S. Appl. No. 15/779,895, dated Aug. 21, 2020, 11 pages.

"Non-Final Office Action", U.S. Appl. No. 15/779,895, dated Aug. 29, 2019, 17 pages.

"Non-Final Office Action", U.S. Appl. No. 16/266,555, dated Sep. 24, 2020, 27 Pages.

"Non-Final Office Action", U.S. Appl. No. 15/779,880, dated Dec. 11, 2019, 11 pages.

"Notice of Allowance", U.S. Appl. No. 15/779,880, dated May 13, 2020, 10 pages.

"Notice of Allowance", U.S. Appl. No. 15/779,904, dated Oct. 8, 2020, 8 Pages.

Bay, et al., "Speeded-Up Robust Features (SURF)", Jun. 2008, pp. 346-359.

Lu, et al., "Fast and Globally Convergent Pose Estimation from Video Images", retrieved from https://ieeexplore.ieee.org/document/862199, Jun. 2000, 13 Pages.

"Corrected Notice of Allowability", U.S. Appl. No. 15/779,904, dated Nov. 18, 2020, 2 pages.

* cited by examiner

METHOD FOR IDENTIFICATION OF CHARACTERISTIC POINTS OF A CALIBRATION PATTERN WITHIN A SET OF CANDIDATE POINTS DERIVED FROM AN IMAGE OF THE CALIBRATION PATTERN

TECHNICAL FIELD OF INVENTION

The invention relates to a method for identification of characteristic points of a calibration pattern within a set of candidate points derived from an image of the calibration pattern.

BACKGROUND OF INVENTION

Recently, an increasing number of vehicles are provided with at least one camera mounted to the vehicle for capturing information about an environment of the vehicle. In particular, the camera is located at a front of the vehicle for acquisition of the road ahead. Image data thus obtained can then be used for various advanced driver assistance systems (ADAS), for example.

From images acquired by such a camera spatial data about objects within the field of view of the camera can be extracted. However, this data is relative to the camera, but not (at least not directly) to the vehicle. Hence, for example positions of objects captured by the camera can only be determined with respect to the camera. To also obtain from images acquired by the camera the positions of such objects relative to the vehicle with high precision and reliability, it is therefore important to precisely know the position and orientation of the camera relative to the vehicle.

For example, to calibrate the orientation of a camera mounted to a vehicle, especially to a truck, it can be useful to acquire an image of a calibration pattern placed in front of the vehicle and to derive the orientation of the camera from perspective distortions of the calibration pattern. Quantifying these distortions to determine, in particular, at least one of a roll angle, a yaw angle and a pitch angle of the camera relative to the vehicle, to the calibration pattern or, preferentially, to both, can especially require identification of characteristic points of the calibration pattern within the image of the calibration pattern. These characteristic points can then, for example, be used to determine at least two horizontal lines and two vertical lines with a horizontal vanishing point being defined by the representations of the horizontal lines in the image of the calibration pattern and a vertical vanishing point being defined by the representations of the vertical lines in the image of the calibration pattern. The roll angle can, in particular, be calculated from coordinates of the horizontal or the vertical vanishing point, the yaw angle from a first coordinate of the horizontal vanishing point along a first, essentially horizontal, axis of the image, and the pitch angle from a second coordinate of the vertical vanishing point along a second, essentially vertical, axis of the image. Such method is described in the patent application EP 3 174 007 A1 titled "Method for calibrating the orientation of a camera mounted to a vehicle".

For identifying characteristic points in an image of a calibration pattern—be they needed for said calibration of the orientation of a camera mounted to a vehicle or for any other purpose —, the image may be preprocessed, for example smoothed and/or filtered. Especially, the (smoothed) image can be filtered such that regions indicative of respective characteristic points appear as spots in the filtered image having pixel values exceeding a certain threshold. The spots might then be identified within the filtered image by an algorithm walking through the image until a pixel with a pixel value exceeding the threshold is found and then tracing a contour of the spot around the spot along the border between pixels whose pixel values exceed the threshold and pixels whose pixel values do not exceed the threshold. In particular, at least possible characteristic points can then be determined as central points of respective spots with a respective central point being calculated as weighted average over the pixels of the spots. Such a method is described in the patent application EP 3 173 975 A1 titled "Method for identification of candidate points as possible characteristic points of a calibration pattern within an image of the calibration pattern".

However, it is possible that such a method or any other method for determining possible characteristic points within a given image not only leads to the characteristic points looked for, but also, for example, to secondary points of the calibration pattern and/or to spuriously identified points which might result from noise or other interferences in the image or from structures in a background of the image which accidentally resemble the calibration pattern or a sub-pattern of the calibration pattern. Therefore, the points obtained by the described methods or by another method may merely be possible characteristic points and, hence, can be regarded as a set of candidate points which are derived from the image of the calibration pattern and within which the true characteristic points of the calibration pattern still must be identified.

A method capable of identifying the characteristic points of a calibration pattern within an image of the calibration pattern with high specificity and yet without the need for high computing capacity is, for example, described in the patent application EP 3 173 979 A1 titled "Method for identification of characteristic points of a calibration pattern within a set of candidate points in an image of the calibration pattern". This method is based on a given set of candidate points derived from the image of the calibration pattern, for example by means of one or more of the methods described in EP 3 174 007 A1 and/or EP 3 173 975 A1, and comprises at least three steps which are executed for each individual candidate point of the set.

The first of said three steps comprises overlaying a template arrangement of template points over the candidate point (i.e. the respective candidate point for which this step is currently executed) such that a principal point of the template points coincides with the candidate point, wherein the template arrangement corresponds to the calibration pattern or to a sub-pattern of the calibration pattern. The template arrangement comprises several template points one of which is the principal point of the template arrangement. This principal point is placed exactly on the candidate point currently under investigation.

The template arrangement serves as a template for the calibration pattern or sub-pattern which should, in some way, be present in the vicinity of the candidate point, if the candidate point is in fact a characteristic point of the calibration pattern. Hence the principal point of the template arrangement corresponds to the characteristic point and the other template points of the template arrangement correspond to secondary points of the calibration pattern merely helping in identifying a respective characteristic point of the calibration pattern.

For example, the calibration pattern comprises a sub-pattern formed by two equally oriented squares contrasting with a background of the calibration pattern, with a corner of one of the squares coinciding with a corner of the other of the squares. This can be regarded as a checkerboard with two rows and two columns only. Especially, the squares can at least essentially be dark or black on a bright or white background. Characteristic points of the calibration pattern containing one or more such sub-patterns may then be the centers of the respective sub-patterns where the corners of the two squares coincide. Secondary points of the calibration pattern can, for example, be all the other corners of the squares, i.e. with exception of the two coinciding corners. In particular, the template arrangement is then a set of seven template points placed as if the template points were the corners of said two squares. The template point in the center of the template arrangement then preferentially is the principal point of the template arrangement.

The second of said three steps comprises, for each template point of the overlaid template arrangement, except the principal point, identifying from the set of candidate points the candidate point closest to the template point. In other words, for each template point, one template point after the other, of all the candidate points that one is selected which is closest to the respective template point. For the principal point of the template arrangement this is not necessary. Because the template arrangement is placed such that the principal point coincides with the candidate point under investigation, this candidate point is of course the candidate point closest to the principal point so that a distance between this candidate point and the principal point is always zero.

After the respective candidate points closest to the template points of the template arrangement have been identified, as the third of said three steps a degree of deviation is determined by summing the distances between each template point of the template arrangement, except the principal point, and the candidate point closest to this template point. Again, the principal point is excepted, because it does not need to be considered. This is because the distance of the principal point of the template arrangement to the candidate point closest to the principal point is necessarily zero (because of their coincidence) and therefore does not contribute to said degree of deviation.

For all other template points, there may be a non-zero distance to the respective candidate points, even if the template arrangement is overlaid to a true characteristic point of the calibration pattern and the template points in this case ideally coincide with secondary points of the calibration pattern or a sub-pattern of the calibration pattern. But due to perspective or other distortions, for example resulting from current parameters of an objective of the camera the image is acquired with, especially if an orientation of the camera is not such that an optical axis of the camera is perpendicular to a plane of the calibration pattern and the camera has a roll angle of zero, there most probably will be non-zero distances between the template points and the respective closest candidate points. The accumulated distance summed over all individual distances will increase with greater deviation from the ideal. Therefore, said sum of distances can be used as a measure for the deviation of the candidate point and its surroundings from the calibration pattern or a sub-pattern of the calibration pattern. The degree of deviation might be normalized by a factor, for example by dividing said sum of distances by the number of summands. However, this is not necessary, since the degree of deviation is primarily used as a relative measure.

After said at least three steps have been executed for each candidate point of the set of candidate points, all those candidate points of the set of candidate points having a degree of deviation below a deviation threshold are identified as characteristic points of the calibration pattern. The threshold may be predetermined and possibly adapted to a normalization of the degree of deviation. However, the threshold can also be dynamically defined, for example by setting the threshold such that an expected number of characteristic points are obtained. Alternatively, the threshold can be dynamically defined by analyzing the distribution of the degrees of deviation for all candidate points and setting the threshold such that it separates a first significant accumulation of degrees of deviation from degrees of deviation with substantially higher values.

The method described uses mainly simple arithmetic operations for placing the template arrangement, identifying the candidate points closest to respective template points, calculating the degrees of deviation by summation of distances and comparing the degrees of deviation with the threshold. Despite the simplicity of the method, it is well-suited to separating the wheat from the chaff as regards the candidate points as possible characteristic points of the calibration pattern.

However, such method relies on the correspondence between the template arrangement and the image of the calibration pattern or sub-pattern. In particular, it is important that the size of the template arrangement matches the size of the calibration pattern or sub-pattern as it appears in the image. The size of the calibration pattern in the image, however, may vary in dependence of the focal length (zoom level) of the camera and/or the distance of the camera to the calibration pattern, in particular. While parameters of the camera such as the focal length may be predetermined, the actual distance of the camera to the calibration pattern might not be known. Therefore, even though the template arrangement corresponds to the calibration pattern or sub-pattern structure-wise, it may not match the image of the calibration pattern with respect to their respective scaling. This may lead to errors in the identification of the characteristic points in the image. Measuring the distance between the camera and the calibration pattern may allow adapting the size of the template arrangement based on the measured distance so as to match the size of the calibration pattern in the image, but requires an additional measurement.

SUMMARY OF THE INVENTION

It is an objective of the invention to provide an improved method of identifying characteristic points of a calibration pattern within a set of candidate points in an image of the calibration pattern which is capable of compensating for an unknown scaling of the calibration pattern in the image of the calibration pattern, due to an unknown distance of the camera used for acquisition of the image to the calibration pattern.

The objective is solved by a method in accordance with claim 1. Advantageous embodiments of the invention are defined by the dependent claims as well as by the following description of the invention and the Figures.

The method according to the invention comprises that, given a set of candidate points derived from the image of the calibration pattern, at least the following steps A to C are executed.

Step A includes scaling a template arrangement of template points which corresponds to the calibration pattern or to a sub-pattern of the calibration pattern to an initial size. As the size of the calibration pattern in the image may be unknown, the initial size to which the template arrangement is scaled may deviate from the actual size of the calibration pattern in the image. Nevertheless, some initial size must be set as a starting point for iteratively approximating the size until it matches the size of the calibration pattern in the image. Generally, the initial size could be set arbitrarily. Preferably, however, the initial size is predetermined. For example, the initial size of the template arrangement can correspond to the size that is expected when assuming that the camera used for acquisition of the image of the calibration pattern is positioned in a known average or nominal distance to the calibration pattern. Alternatively, according to a preferred embodiment, the initial size is set to a size that corresponds to an (under certain calibration circumstances) minimally possible distance between the camera and the calibration pattern or to a size which is (slightly) greater than that.

Step B includes using the scaled template arrangement for determining potential characteristic points. This step can in general correspond to known methods for identification of characteristic points of a calibration pattern within a set of candidate points in an image of the calibration pattern, for example to one the methods described in EP 3 173 979 A1, with the difference that not a fixed-size template arrangement is used, but a scaled template arrangement the scaling of which varies for different iterations of Step B, as will be described below.

In particular, step B includes that for each candidate point which has been derived from the image of the calibration pattern by some means, for example by one of the methods described in EP 3 173 975 A1, the following sub-steps (i) to (iii) are executed. Sub-step (i) includes that the scaled template arrangement is overlaid over the candidate point such that a principal point of the template points of the scaled template arrangement coincides with the candidate point. Sub-step (ii) includes that for each template point of the overlaid scaled template arrangement, except the principal point, the candidate point closest to the template point is identified from the set of candidate points. And sub-step (iii) includes that a degree of deviation is determined by summing or averaging the distances between each template point of the overlaid scaled template arrangement, except the principal point, and the candidate point closest to this template point. Furthermore, step B comprises that all those candidate points of the set of candidate points for which the determined degree of deviation is below a deviation threshold are identified as potential characteristic points. This is a difference to said known methods, since the identified characteristic points are preliminarily considered to be merely potential characteristic points due to the uncertainty about whether the scaling of the template arrangement sufficiently matches the size of the calibration pattern in the image for a reliable identification of characteristic points.

A further difference to said known methods is that the method does not stop after step B, but further comprises step C for reviewing whether the identified potential characteristic points can be considered final or whether the identification of potential characteristic points has to be repeated with a differently scaled template arrangement for better correspondence of the size of the template arrangement to the size of the calibration pattern in the image.

Step C includes determining whether the potential characteristic points identified in step B meet a termination criterion and continuing differently in dependence of the outcome of the determination. If the termination criterion is not met, the scaling of the template arrangement is modified and steps B and C are repeated with the modified scaled template arrangement (instead of the scaled template arrangement used in the preceding iteration of step B). Otherwise, i.e. if the termination criterion is met, those potential characteristic points which have been identified in the last iteration of step B are identified as the characteristic points of the calibration pattern. In other words, steps B and C are iterated with differently scaled template arrangements, as long as the termination criterion is not met. If after one or more iterations the termination criterion is met, the potential characteristic points identified in the last iteration are no longer considered potential, but finally identified as the characteristic points which the image was searched for.

In this way, the method according to the invention allows testing different scalings of the template arrangement for their correspondence to the size of the calibration pattern in the image and finally obtaining characteristic points which result from the template arrangement with the best correspondence. Furthermore, the method provides robust means of automatically identifying the characteristic points in the image of the calibration pattern without having to determine the distance between the camera and the calibration pattern first.

According to an embodiment, in step C the scaling of the template arrangement is modified by adjusting the size of the template arrangement by a current step size whose sign and magnitude depend on the number of potential characteristic points identified in step B and/or on a quality index derived from the potential characteristic points identified in step B. In other words, after the first execution of step B in which the template arrangement is scaled to its initial size, in each of the following iterations of step B the size of the template arrangement used in that iteration corresponds to the size of the template arrangement in the immediately preceding iteration increased or decreased by the then current step size, wherein the step size changes in dependence of results of one or more preceding iterations. Whether the size increases or decreases depends on the sign of the current step size. By what amount the size increases or decreases depends on the magnitude of the current step size. The modification of the size of the template can be written as—

$$TMPLS_n = TMPLS_{n-1} - Step_n, \quad (1)$$

wherein $TMPLS_n$ is the size of the template arrangement used in the n-th iteration of step B and $Step_n$ is the current step size of the n-th iteration.

Initially, the sign and magnitude, i.e. the absolute value, of the current step size is set to an initial step size that in general could be set arbitrarily, but preferably is predetermined. In particular, if the initial size of the template arrangement corresponds to a minimum distance of the camera to the calibration pattern and is therefore expectedly larger than the size which best matches the size of the calibration pattern in the image, the sign of the initial step size is preferably positive such that the size of the template arrangement is decreased (due to the subtraction of a positive value) in the next iteration of step B. Conversely, if the initial size of the template arrangement corresponds to a minimum distance of the camera to the calibration pattern or to a maximum template size, the sign of the initial step size is preferably negative such that the size of the template arrangement is increased (due to the subtraction of a negative value) in the next iteration of step B. The magnitude of the initial step size can be a fraction the initial size of the template arrangement, for example in the range from 10% to 33%, preferably from 15% to 25%, in particular 20% of the initial size of the template arrangement.

Preferably, if the number of potential characteristic points identified in step B is below a significance threshold for all of the iterations of step B so far, the scaling of the template arrangement is modified in step C by adjusting the size of the template arrangement by a constant initial step size. In other words, the size of the template arrangement is repeatedly adjusted by said initial step size as long as the number of potential characteristic points has not reached the significance threshold. This threshold may depend on the number of characteristic points expected to be found within the image of the calibration pattern and may be in the range from 0% to 33% of that number, for example. The expected number of characteristic points may correspond to the number of occurrences of a sub-pattern of the calibration pattern within the calibration pattern, wherein each occurrence of the sub-pattern defines one characteristic point to be found in the image. For example, the calibration pattern may comprise ten occurrences of the sub-pattern so that ten characteristic points shall be identified in the image of the calibration pattern. In this example, the significance threshold can be in the range from 1 to 3. If the significance threshold is 1, the size of the template arrangement is adjusted by the constant initial step size as long as no potential characteristic point could be identified.

According to an embodiment, if the number of potential characteristic points identified in the latest iteration of step B is equal to or above a significance threshold, in particular the said significant threshold, for the first time, in step C the magnitude of the current step size is set to half the size of the template arrangement and possibly rounded and the scaling of the template arrangement is modified by adjusting the size of the template arrangement by the (such changed) current step size. Instead of dividing the current step size by two, it could generally be divided by any other predetermined value. The current step size is not necessarily rounded. However, rounding may be useful to restrict the current step size to a certain set of admissible values. For example, the current step size can be restricted to integral numbers. If the size of the template arrangement corresponds to an odd number, after being divided the current step size can be rounded down to the greatest integral number smaller than, or rounded up to the smallest integral number greater than, the exact result of the division. Preferably the current step size is rounded up so as to prevent the step size from becoming zero. The current step size may be changed according to the following equation.

$$Step_n = TMPLS_{n-1} \text{ div } 2, \quad (2)$$

wherein the div operator signifies a division without remainder. Rounding can also include preventing the current step size from decreasing below a predetermined minimum step size by setting the current step size to the minimum step size, if the current step size would otherwise decrease below the minimum step size.

According to an embodiment, if the number of potential characteristic points identified in the latest iteration of step B, i.e. the last iteration of step B so far, is below a significance threshold, in particular the said significant threshold, but the number of potential characteristic points identified in any previous iteration of step B is equal to or above the significance threshold, in step C the sign of the current step size is reversed and the scaling of the template arrangement is modified by adjusting the size of the template arrangement by the (such changed) current step size. In other words, if the number of identified potential characteristic points drops below the significance threshold after previously having reached the significance threshold, this is considered an indication that the ideal size of the template arrangement, i.e. the size the best matches the size of the calibration pattern in the image, has been overshot. In reaction to this, the sign of the current step size is reversed, so as to approximate the ideal size of the template arrangement from the other direction then.

According to a further embodiment, if the number of potential characteristic points identified in the latest iteration of step B is equal to or above a significance threshold, in particular the said significant threshold, and preferably also the number of potential characteristic points identified in the immediately preceding iteration of step B is equal to or above the significance threshold, in step C the magnitude of the current step size is decreased by a constant factor and possibly rounded and the scaling of the template arrangement is modified by adjusting the size of the template arrangement by the (such changed) current step size. By starting with a coarse current step size which is decreased after the significance threshold is reached, the approximation of the ideal size of the template arrangement is accelerated at first, but still allows for a precise fine-tuning at the end. Decreasing the current step size can start, as soon as the number of identified potential characteristic points has reached the significance threshold. However, as a precaution, the current step size can alternatively be decreased by the constant factor only after the significance threshold has been reached for the second iteration in succession. The constant factor is preferably 2. Consequently, he current step size may be changed according to the following equation—

$$Step_n = Step_{n-1} \text{ div } 2, \quad (3)$$

wherein the div operator signifies a division without remainder. Other or further rounding as described above may be applied.

As explained above, the sign and magnitude of the current step size may not only depend on the number of the identified potential characteristic points, but also, or alternatively, depend on a quality index which is derived from the identified potential characteristic points. According to an embodiment, the quality index is derived from the potential characteristic points by the following steps.

First, a template size parameter is determined by calculating the sum or average of the distances of the template points of the scaled template arrangement, except the principal point of the template points, to the principal point of the template points. This template size parameter is therefore indicative of the size of the template arrangement in its current scaling. The distances of the template points to the principal point of the template points may be calculated as Euclidean distances or according to any other metric. In particular, the distance between two points can be calculated according to the so-called Manhattan metric as the sum of the absolute differences of their coordinates. As calculation of square roots is not required, this may advantageously reduce the computational effort compared to the calculation of Euclidean distances.

Then, for each potential characteristic point a similar parameter is determined based on the candidate points that seem to correspond to an occurrence of the pattern or sub-pattern in the image. This is done by, for each potential characteristic point, determining a pattern size parameter by calculating the sum or average of the distances of those candidate points which are closest to one of the template points of the scaled template arrangement when it is overlaid over the potential characteristic point, to the potential characteristic point. Again, the distances may be calculated according to the Euclidean metric, preferably according to the Manhattan metric, or in general to any other suitable metric. Such pattern size parameter is indicative of the size of a pattern or sub-pattern potentially identified within the image of the calibration pattern.

After that, each of the pattern size parameters is compared to the template size parameter by calculating for each potential characteristic point the difference between the template size parameter and the pattern size parameter. Based on this difference a match value is determined for each potential characteristic point. The match value can, for example, simply correspond to said difference between the template size parameter and the pattern size parameter. Finally, the quality index is determined by summing or averaging all of the determined match values. Therefore, the quality index is indicative of the overall deviation of the scaling of the template arrangement from the ideal scaling which is best adapted to the size in which the calibration pattern appears in the image.

Since the quality index is based on differences between the template size parameter and the pattern size parameters, the sign of the quality index can in particular be indicative of whether the size of the template arrangement is larger or smaller than the ideal size. In other word, preferably the sign of the quality index changes when the size of the template arrangement crosses, i.e. decreases below or increases above, the size that best matches the size of the calibration patter in the image. Therefore, a change of sign of the quality index can be used to determine and to react to such crossing. According to an embodiment, if the sign of the quality index derived from the potential characteristic points determined in the latest iteration of step B differs from the sign of the quality index derived from the potential characteristic points determined in the immediately preceding iteration of step B, the sign of the current step size is reversed and the scaling of the template arrangement is modified by adjusting the size of the template arrangement by the (such changed) current step size.

Modifying the scaling of the template arrangement by adjusting its size by a current step size that changes in dependence to certain conditions leads to an increasingly improving approximation of an ideally scaled template arrangement based on which the characteristic points can finally be identified within the set of candidate points derived from the image of the calibration pattern. At what point, the approximation is terminated so as to finally obtain the characteristic points, is determined by the termination criterion.

According to an embodiment, the termination criterion is met, if two conditions are fulfilled. The first condition is that the current step size is equal to a minimum step size or below a step size threshold. For this, either a minimum step size or a step size threshold must be defined, which then allows ensuring that a certain precision in approximating the ideal scaling of the template arrangement has been achieved, before the repeated iteration of steps B and C is stopped. The minimum step size can be the same minimum step size as mentioned above. The minimum step size or the step size threshold can, for example, be equal to 1. The second condition is that the sign of the quality index derived from the potential characteristic points determined in the latest iteration of step B differs from the sign of the quality index derived from the potential characteristic points determined in the immediately preceding iteration of step B. That both conditions are fulfilled hence indicates that the scaling of the template arrangement has crossed the ideal scaling by a step which has the minimum step size or is smaller than the step size threshold. Therefore, the size of the scaled template arrangement used in the latest iteration of step B deviates from the ideal size only by less than the suitably selected minimum step size or less than the suitably selected step size threshold, and consequently the approximation has reached its objective and can be terminated.

The described method not only provides the characteristic points to be identified within the set of candidate points derived from the image of the calibration pattern, but at the same time provides information about the scaling of the template arrangement which best matched the scaling of the calibration pattern in the image. This information, in turn, is correlated to the distance of the camera to the calibration pattern, because the size of the calibration pattern in the image depends on that distance. The method can therefore advantageously be extended so as to provide additional information.

Hence, according to an embodiment, the method further comprises a step D to be executed after step C, i.e. after the termination criterion is met and steps B and C are no longer repeated. Step D includes that an approximated template arrangement size is calculated by adjusting the size of the scaled template arrangement used in the last iteration of step B by a fractional step size. This fractional step size is the negative of the current step size times the absolute value of the quality index derived in the last iteration of step C divided by the sum of the absolute values of the quality indices determined in the last two iterations of step C, i.e. in the last iteration of step C and in the immediately preceding iteration of step C. The termination criterion is preferably such that the ideal size of the template arrangement lies between the two sizes of the scaled template arrangements used in the last two iterations of step B, with the current step size corresponding to the difference between these two sizes. Consequently, the size of the scaled template arrangement used in the last iteration of step B deviates from the ideal size by a fraction of the current step size. The quality indices determined in the last two iterations of step C are indicative of which one of the two last used sizes is closer to the ideal size (in particular, a smaller quality index may indicate a smaller deviation from the ideal size). Therefore, the quality indices, in particular their absolute values, can be used to calculate a weighted average of the two sizes. In the present embodiment, this is done by adjusting the last used size by said fractional step size which is derived from the current step size by the quotient of one of the quality indices divided by the sum of both quality indices. The fractional step size FracStep can, for example, be calculated by the following equation—

$$\text{FracStep} = -|Q_N|/(|Q_N| + |Q_{N-1}|) * \text{Step}_N, \quad (4)$$

wherein $Q_n$ is the quality index determined in the n-th iteration of step C, and N corresponds to the last iteration. The sign of the fractional step size is reversed with respect to the sign of the (last) current step size, because the ideal size of the template arrangement has been crossed when the size of the template arrangement was adjusted by the current step size for the last time, and the direction of adjustment therefore has to be reversed so as to return towards the ideal size. The approximated template arrangement size FinalTM-PLS can then be calculated similarly to equation (1) according to the following equation—

$$\text{FinalTMPLS} = \text{TMPLS}_N - \text{FracStep}. \quad (5)$$

According to an embodiment, the method further comprises a step E to be executed after step D. Step E includes that an estimated distance of a camera used for acquisition of the image of the calibration pattern to the calibration pattern is derived by dividing a constant which represents characteristics of the camera, in particular parameters of an objective of the camera such as the focal length, by the approximated template arrangement size. This can be described by the following equation—

$$D_{est} = K/\text{FinalTMPLS}, \quad (6)$$

wherein $D_{est}$ is the estimated distance and K is the constant representing characteristics of the camera. Such embodiment of the method not only does not require measuring the distance of the camera to the calibration pattern for identifying the characteristic points of the calibration pattern within the image of the calibration pattern, but even provides an estimation of that distance itself. The estimated distance can then further be used to also determine other parameters, such as an estimated focal length of an objective of the camera, for example.

The method according to the invention usually requires not more than six to ten iterations applied to only a single image frame, although a calibration of the camera may be based on a sequence of hundred or more frames. The size of the template arrangement used in the last iteration of steps B and C or, if determined, preferably the approximated template arrangement size can then be used for all subsequent frames of the image sequence as a constant parameter. As a result, the time loss due to the iterations in the method does not exceed 0.25% to 0.5% of the time required to perform such overall calibration procedure on a sequence of image frames.

The objective of the invention is furthermore solved by a computer program product in accordance with claim 12 and, in particular, by a computer program product with a computer program which has software means for carrying out a method in accordance with at least one of the embodiments described above, if the computer program is executed in a computing device. Due to the preferably low complexity of the calculations during execution of the method, the computer program may especially be suited to be executed on a microcontroller or an embedded system of a camera by means of which the image of the calibration pattern is acquired.

Further features and advantages will appear more clearly on a reading of the following detailed description of the preferred embodiment, which is given by way of non-limiting example only and with reference to the accompanying drawings.

BRIEF DESCRIPTION OF DRAWINGS

The present invention will now be described, by way of example with reference to the accompanying drawings, in which.

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

'One or more' includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for describing embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Figure 1:
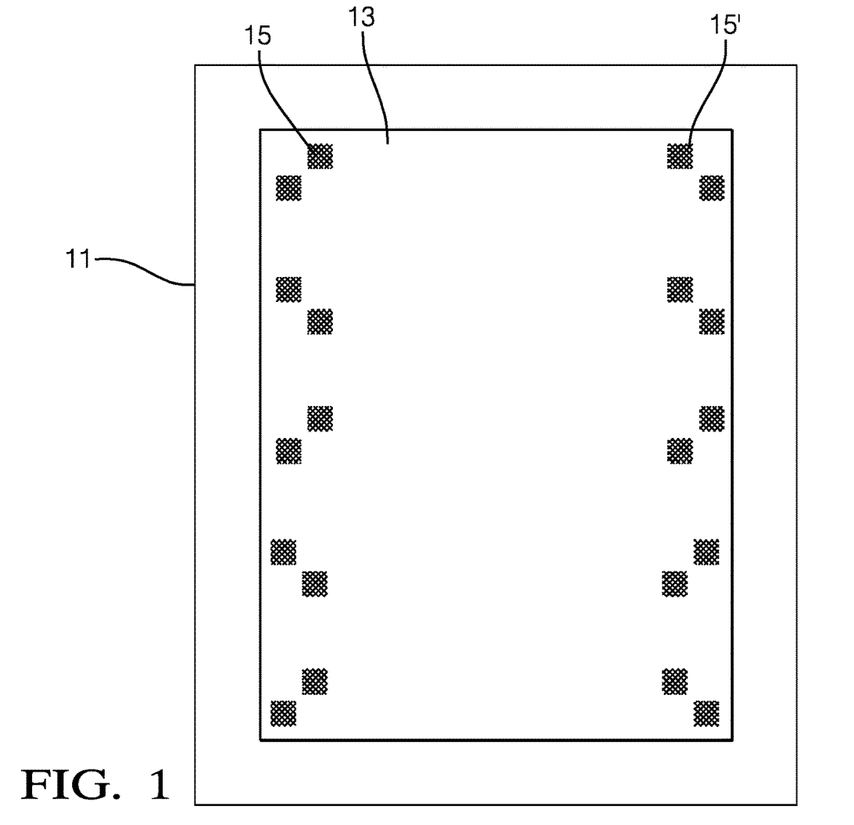
FIG. 1 is an image of a calibration pattern in accordance with one embodiment.

FIG. 1 shows an exemplary image 11 of a calibration pattern 13 acquired with a camera which is not shown. The calibration pattern 13 comprises ten sub-patterns 15, 15', representations of which can be recognized in the image 11. There are sub-patterns of a first type 15 and sub-patterns of a second type 15'. The sub-patterns 15, 15' of both types are each formed by two equally oriented squares, with a corner of one of the squares coinciding with a corner of the other of the squares, wherein the relative orientation of the two squares of a respective sub-patterns of the first type 15 is perpendicular to the relative orientation of the two squares of a respective sub-pattern of the second type 15'.

Five of the sub-patterns 15, 15' are arranged along a first vertical line, the other five along a second vertical line. Each of the sub-patterns 15, 15' on the first vertical line forms a pair with a respective sub-pattern 15, 15' on the second vertical line such that both sub-patterns 15, 15' of a respective pair are aligned on a horizontal line. Hence, in total there are five horizontal lines. While the two vertical lines and the five horizontal lines are not depicted and hence are no explicit part of the calibration pattern, they are unambiguously defined by the sub-patterns 15, 15', in particular by respective characteristic points of these sub-patterns 15, 15' which are situated at the centers of the sub-patterns 15, 15', where the two squares are in contact to each other.

Especially, by convolution of the image 11 with a filter kernel corresponding to the sub-patterns 15, 15' and identifying spots within the such-filtered image, possible characteristic points of the calibration pattern 13 can be determined (cf. white points in FIG. 1). Since these possible characteristic points also comprise false positives, they are candidate points which have to be further evaluated to identify the true characteristic points.

The true characteristic points are identified by searching for a point structure characteristic for the first sub-pattern 15 or for the second sub-pattern 15'. This is done by defining a region of interest 17 around a respective candidate point and overlaying a template arrangement such that a principal point of the template arrangement coincides with the candidate point, with a first template arrangement being specific to the first sub-pattern 15 and a second template arrangement being specific to the second sub-pattern 15'. This is shown exemplarily in FIG. 2, wherein four regions of interest 17 around a respective candidate point (cf. central black asterisk) are shown.

Figure 2:
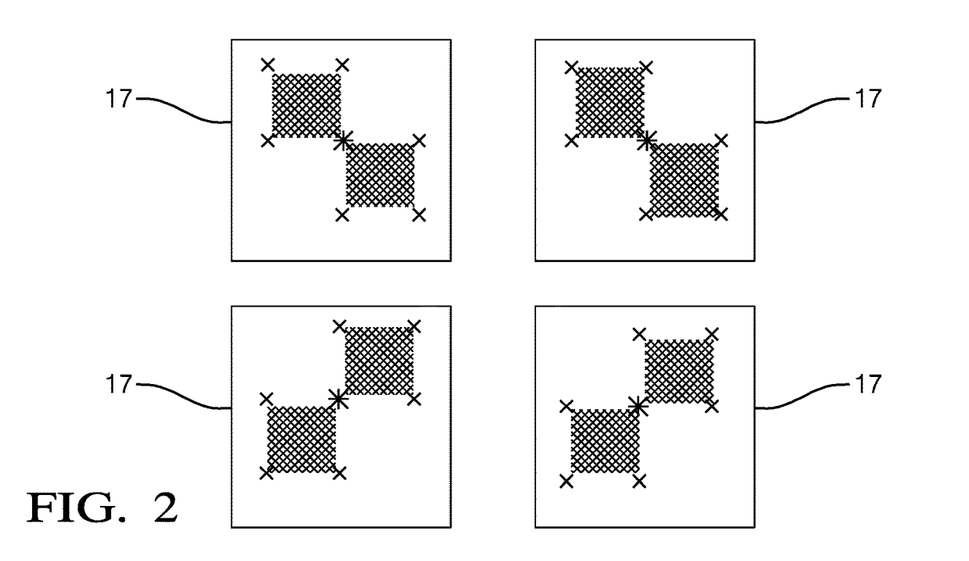
FIG. 2 is a template of a sub-pattern in accordance with one embodiment.

In FIG. 2 the white (horizontal and vertical) crosses are the candidate points within the respective region of interest 17. The black (diagonal) crosses are template points which together form the first or second template arrangement, respectively. The central template point depicted as black asterisk is the principal point of the template arrangement. Each region of interest 17 of FIG. 2 is shown including the candidate and template points contained therein and together with the respective region of the image 11 so that the respective sub-pattern 15, 15' of the calibration pattern 13 can be recognized. The upper two regions of interest 17 correspond to the first sub-pattern 15, while the lower two regions of interest 17 correspond to the second sub-pattern 15'. Therefore, in the upper two regions of interest 17 the first template arrangement corresponding to the first sub-pattern 15 is shown, and in the lower two regions of interest 17 the second template arrangement corresponding to the second sub-pattern 15' is shown.

As can be seen from FIG. 2, the template points of a respective template arrangement, except the principal point, do not perfectly coincide with their closest candidate points. The overall (first or second, respectively) degree of deviation is calculated by summing the distances between the template points and their respective closest candidate points. If the candidate point over which the template arrangement is overlaid is a characteristic point of the first sub-pattern 15 or the second sub-pattern 15' and the corresponding template arrangement is used (as in FIG. 2), the distances are relatively small. For spurious candidate points the distances would be distinctively greater. Therefore, the degree of deviation can be used to distinguish true characteristic points of the calibration pattern 13 from spurious ones.

Figure 3:
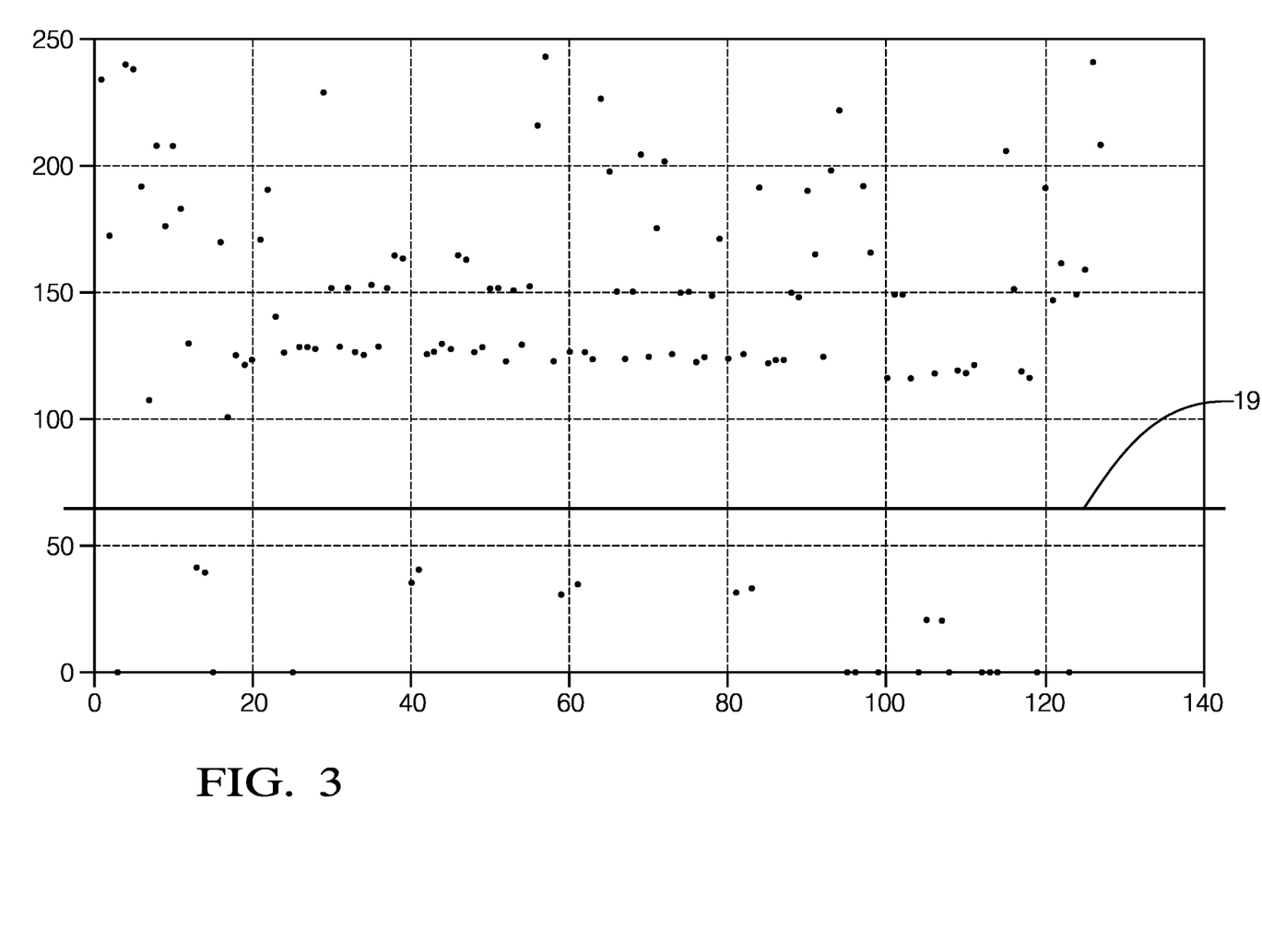
FIG. 3 is a graph of degrees of deviation of all candidate points within the image of FIG. 1 in accordance with one embodiment.

This is exemplarily shown in FIG. 3. In FIG. 3 the calculated degrees of deviation of all candidate points within the image 11 are plotted as dots in a diagram. As can be directly seen, most degrees of deviation have high values with only a few being separate from the bulk having values in a lower range. A threshold 19 is indicated as a line separating the bulk from these few. With exception of the dots corresponding to a degree of deviation of zero, all dots below the threshold 19 then represent characteristic points of the calibration pattern 13. In this way, the characteristic points of the calibration pattern 13 are reliably identified.

As can further be seen from FIG. 2, the size of the template arrangement is very similar to the size of the respective sub-pattern 15, 15' over which it is overlaid. However, if the distance between the camera and the calibration pattern 13 varies, the calibration pattern 13 and its sub-patterns 15, 15' appear greater or smaller in the image 11. Therefore, the characteristic points identified within such image 11 are at least preliminarily to be considered merely potential characteristic points, and the identification of such potential characteristic points is repeated with differently scaled template arrangements, until a termination criterion is met which indicates that the scaling of the template arrangement sufficiently precisely matches the size of the calibration pattern 13 and its sub-patterns 15, 15' (as in FIG. 2) and the potential characteristic points identified in the last iteration can therefore be identified as the characteristic points of calibration pattern within the image.

Figure 4:
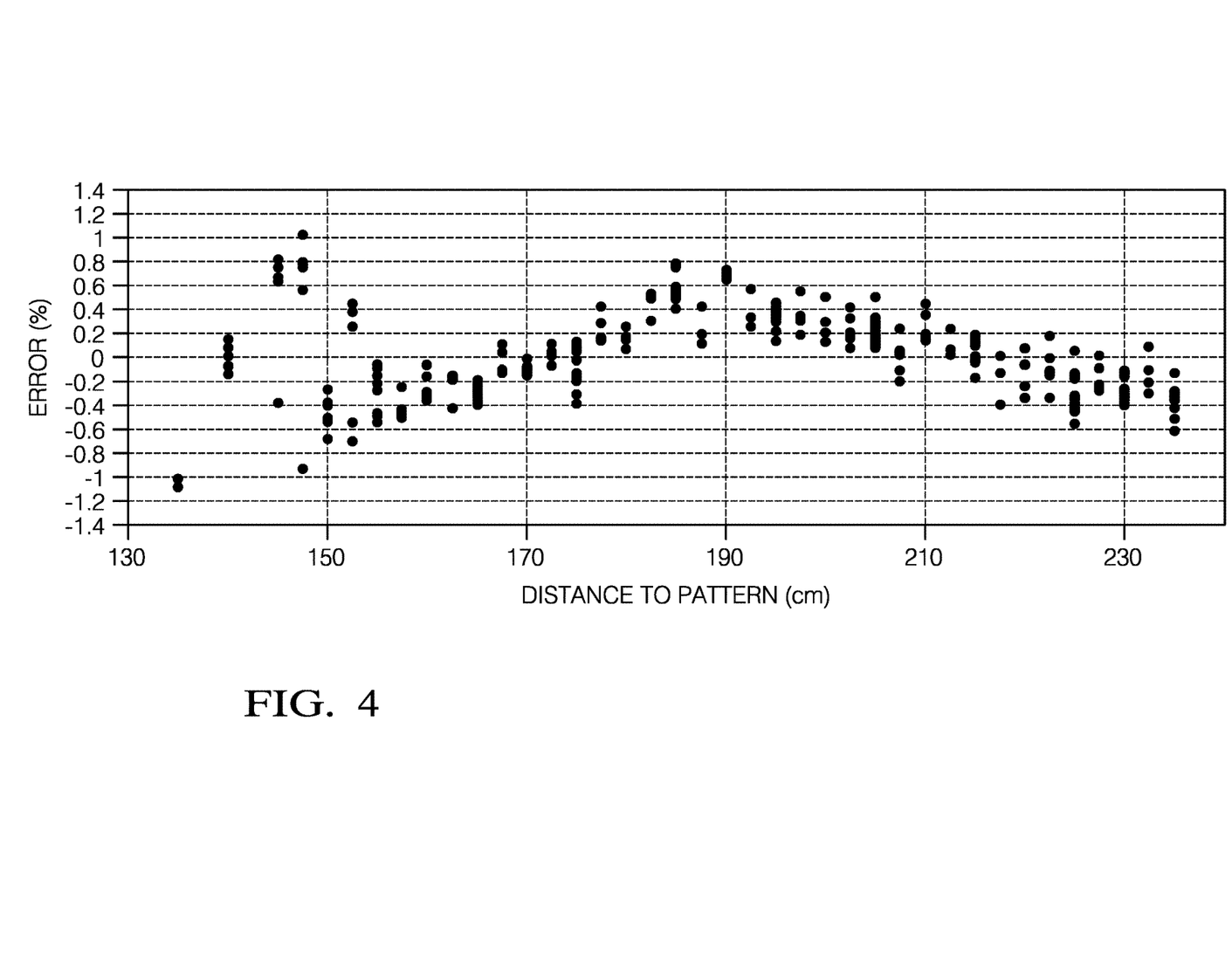
FIG. 4 is a graph of the results of an experiment in accordance with one embodiment.

FIG. 4 shows the results of an experiment in which the method according to the invention has been executed multiple times for varying distances between the calibration pattern 13 and the camera used for acquiring the image 11 of the calibration pattern 13. The distances varied from 130 to 240 cm in steps of 2.5 to 10 cm. For each of the distances, measurements were repeated with different values of pitch, yaw and roll angles, varying by ±1°. To each of the measurements the method according to the invention was applied. The results obtained therefrom have been used to derive an estimated distance between the calibration pattern 13 and the camera which was then compared to the actual distance between the calibration pattern 13 and the camera. The graph of FIG. 4 shows the error in percent between the obtained estimated distance and the actual distance for each measurement at the different respective distances. As can be seen, the method according to the invention allows for determination of the distance with an error of essentially less than 1%.

While this invention has been described in terms of the preferred embodiments thereof, it is not intended to be so limited, but rather only to the extent set forth in the claims that follow.

We claim:

1. A method for identification of characteristic points of a calibration pattern within a set of candidate points derived from an image of the calibration pattern, the method comprising the steps of:
   A] scaling a template arrangement of template points that corresponds to the calibration pattern or to a sub-pattern of the calibration pattern to an initial size;
   B] using the scaled template arrangement for determining potential characteristic points by, for each candidate point,
      (i) overlaying the scaled template arrangement over the candidate point such that a principal point of the template points of the scaled template arrangement coincides with the candidate point;
      (ii) for each template point of the overlaid scaled template arrangement, except the principal point, identifying from the set of candidate points the candidate point closest to the template point; and
      (iii) determining a degree of deviation by summing or averaging distances between each template point of the overlaid scaled template arrangement, except the principal point, and the candidate point closest to this template point; and
      (iv) identifying as the potential characteristic points all those candidate points of the set of candidate points that have a degree of deviation below a deviation threshold; and C] determining whether the potential characteristic points meet a termination criterion, and:
if the termination criterion is not met, modifying the scaling of the template arrangement and repeating steps B and C with the modified scaled template arrangement, and
if the termination criterion is met, identifying the potential characteristic points identified in the last iteration of step B as the characteristic points of the calibration pattern.

2. The method in accordance with claim 1,
wherein in step C the scaling of the template arrangement includes adjusting a size of the template arrangement by a current step size whose sign and magnitude depend on a number of potential characteristic points identified in step B or on a quality index derived from the potential characteristic points identified in step B.

3. The method in accordance with claim 2,
wherein in step C, if the number of potential characteristic points identified in step B is below a significance threshold for all the iterations of step B so far, the scaling of the template arrangement includes adjusting the size of the template arrangement by a constant initial step size.

4. The method in accordance with claim 2,
wherein in step C, if the number of potential characteristic points identified in the latest iteration of step B is equal to or above a significance threshold for a first time, the magnitude of the current step size is set to half the size of the template arrangement, and the scaling of the template arrangement includes adjusting the size of the template arrangement by the current step size.

5. The method in accordance with claim 2,
wherein in step C, if the number of potential characteristic points identified in the latest iteration of step B is below a significance threshold, but the number of potential characteristic points identified in a previous iteration of step B is equal to or above the significance threshold, a sign of the current step size is reversed and the scaling of the template arrangement includes adjusting the size of the template arrangement by the current step size.

6. The method in accordance with claim 2,
wherein in step C, if the number of potential characteristic points identified in the latest iteration of step B is equal to or above a significance threshold and the number of potential characteristic points identified in an immediately preceding iteration of step B is equal to or above the significance threshold, the magnitude of the current step size is decreased by a constant factor, and the scaling of the template arrangement includes adjusting the size of the template arrangement by the current step size.

7. The method in accordance with claim 2,
wherein the quality index is derived from the potential characteristic points by:
determining a template size parameter by calculating a sum or an average of the distances of the template points of the scaled template arrangement, except the principal point of the template points, to the principal point of the template point;
for each potential characteristic point:
determining a pattern size parameter by calculating a sum or an average of the distances of those candidate points that are closest to one of the template points of the scaled template arrangement when it is overlaid over the potential characteristic point to the potential characteristic point; and
determining a match value by calculating a difference between the template size parameter and the pattern size parameter; and
determining the quality index by summing or averaging the determined match values.

8. The method in accordance with claim 2,
wherein in step C, if a sign of the quality index derived from the potential characteristic points determined in the latest iteration of step B differs from a sign of the quality index derived from the potential characteristic points determined in an immediately preceding iteration of step B, a sign of the current step size is reversed and the scaling of the template arrangement includes adjusting the size of the template arrangement by the current step size.

9. The method in accordance with claim 2,
wherein the termination criterion is met, if:
the current step size is equal to a minimum step size or below a step size threshold; and
a sign of the quality index derived from the potential characteristic points determined in the latest iteration of step B differs from a sign of the quality index derived from the potential characteristic points determined in an immediately preceding iteration of step B.

10. The method in accordance with claim 2,
further comprising after step C, the step of:
D] calculating an approximated template arrangement size by adjusting the size of the scaled template arrangement used in the last iteration of step B by a fractional step size that is a negative of the size of the current step times an absolute value of the quality index derived in the last iteration of step C divided by a sum of absolute values of the quality indices determined in the last iteration of step C and in an immediately preceding iteration of step C.

11. The method in accordance with claim 10, the method further comprising after step D, the step of:
E] deriving an estimated distance of a camera used for acquisition of the image of the calibration pattern to the calibration pattern by dividing a constant that represents characteristics of the camera by the approximated template arrangement size.

12. A non-transitory computer-readable storage media comprising computer-executable instructions that, when executed, cause a processor of a computing device to perform the following steps:
A] scale a template arrangement of template points that corresponds to a calibration pattern or to a sub-pattern of the calibration pattern to an initial size;
B] use the scaled template arrangement for determining potential characteristic points, for each candidate point of a set of candidate points derived from an image of the calibration pattern, in the following manner:
(i) overlay the scaled template arrangement over the candidate point such that a principal point of the template points of the scaled template arrangement coincides with the candidate point;
(ii) for each template point of the overlaid scaled template arrangement, except the principal point, identify from the set of candidate points the candidate point closest to the template point; and
(iii) determine a degree of deviation by summing or averaging distances between each template point of the overlaid scaled template arrangement, except the principal point, and the candidate point closest to this template point; and (iv) identify as the potential characteristic points all those candidate points of the set of candidate points that have a degree of deviation below a deviation threshold; and C] determine whether the potential characteristic points meet a termination criterion and:

if the termination criterion is not met, modify the scaling of the template arrangement and repeat steps B and C with the modified scaled template arrangement, and if the termination criterion is met, identify the potential characteristic points identified in the last iteration of step B as the characteristic points of the calibration pattern.

13. The non-transitory computer-readable storage media of claim 12, the non-transitory computer-readable storage media comprising further computer-executable instructions that, when executed, cause the processor of the computing device to:

wherein in step C the scaling of the template arrangement includes adjust a size of the template arrangement by a current step size whose sign and magnitude depend on a number of potential characteristic points identified in step B or on a quality index derived from the potential characteristic points identified in step B.

14. The non-transitory computer-readable storage media of claim 13, wherein in step C, if the number of potential characteristic points identified in step B is below a significance threshold for all the iterations of step B so far, the scale of the template arrangement includes adjust the size of the template arrangement by a constant initial step size.

15. The non-transitory computer-readable storage media of claim 13, wherein in step C, if the number of potential characteristic points identified in the latest iteration of step B is equal to or above a significance threshold for a first time, the magnitude of the current step size is set to half the size of the template arrangement, and the scale of the template arrangement includes adjust the size of the template arrangement by the current step size.

16. The non-transitory computer-readable storage media of claim 13, wherein in step C, if the number of potential characteristic points identified in the latest iteration of step B is below a significance threshold, but the number of potential characteristic points identified in a previous iteration of step B is equal to or above the significance threshold, a sign of the current step size is reversed and the scale of the template arrangement includes adjust the size of the template arrangement by the current step size.

17. The non-transitory computer-readable storage media of claim 13, wherein in step C, if the number of potential characteristic points identified in the latest iteration of step B is equal to or above a significance threshold and the number of potential characteristic points identified in an immediately preceding iteration of step B is equal to or above the significance threshold, the magnitude of the current step size is decreased by a constant factor, and the scale of the template arrangement includes adjust the size of the template arrangement by the current step size.

18. The non-transitory computer-readable storage media of claim 13, the non-transitory computer-readable storage media comprising further computer-executable instructions that, when executed, cause the processor of the computing device to derive the quality index from the potential characteristic points according to the following steps:

determine a template size parameter by calculating a sum or an average of the distances of the template points of the scaled template arrangement, except the principal point of the template points, to the principal point of the template point;

for each potential characteristic point:

determine a pattern size parameter by calculating the a sum or an average of the distances of those candidate points that are closest to one of the template points of the scaled template arrangement when it is overlaid over the potential characteristic point to the potential characteristic point, and determine a match value by calculating a difference between the template size parameter and the pattern size parameter; and determine the quality index by summing or averaging the determined match values.

19. The non-transitory computer-readable storage media of claim 13, wherein in step C, if a sign of the quality index derived from the potential characteristic points determined in the latest iteration of step B differs from a sign of the quality index derived from the potential characteristic points determined in an immediately preceding iteration of step B, a sign of the current step size is reversed and the scale of the template arrangement includes adjust the size of the template arrangement by the current step size.

20. The non-transitory computer-readable storage media of claim 13, wherein the termination criterion is met, if:

the current step size is equal to a minimum step size or below a step size threshold; and a sign of the quality index derived from the potential characteristic points determined in the latest iteration of step B differs from a sign of the quality index derived from the potential characteristic points determined in an immediately preceding iteration of step B.

* * * * *